United States Patent
Kazama et al.

(10) Patent No.: US 9,449,124 B2
(45) Date of Patent: Sep. 20, 2016

(54) SIMULATION DEVICE, METHOD AND PROGRAM PRODUCT TO DETERMINE PHYSICAL QUANTITY OF A PLURALITY OF PARTICLES UNDER DISTURBANCE

(71) Applicant: FUJITSU LIMITED, Kawasaki-shi, Kanagawa (JP)

(72) Inventors: Masaki Kazama, Kawasaki (JP); Seiro Omata, Kanazawa (JP)

(73) Assignee: FUJITSU LIMITED, Kawasaki (JP)

( * ) Notice: Subject to any disclaimer, the term of this patent is extended or adjusted under 35 U.S.C. 154(b) by 516 days.

(21) Appl. No.: 13/965,262

(22) Filed: Aug. 13, 2013

(65) Prior Publication Data

US 2013/0338977 A1    Dec. 19, 2013

Related U.S. Application Data

(63) Continuation of application No. PCT/JP2011/053095, filed on Feb. 15, 2011.

(51) Int. Cl.
  *G06F 7/60* (2006.01)
  *G06F 17/10* (2006.01)
  *G06F 17/50* (2006.01)
  *G06F 17/13* (2006.01)

(52) U.S. Cl.
  CPC .......... *G06F 17/5018* (2013.01); *G06F 17/13* (2013.01); *G06F 17/5009* (2013.01); *G06F 2217/16* (2013.01)

(58) Field of Classification Search
  CPC .............. G06F 17/5018; G06F 17/13; G06F 17/5009; G06F 2217/16

USPC ............................................................ 703/2
  See application file for complete search history.

(56) References Cited

U.S. PATENT DOCUMENTS

2008/0126045 A1*  5/2008  Shan .................. G06F 17/5018
                                                            703/9

FOREIGN PATENT DOCUMENTS

| JP | 7-334484 | 12/1995 |
| JP | 10-185755 | 7/1998 |
| WO | WO-2008/020634 | 2/2008 |

OTHER PUBLICATIONS

M. Nakano et al., "Radioactivity Transfer Model in Global Ocean", JNC Technical Review, No. 11, Japan Nuclear Cycle Development Institute, The Japan Society of Mechanical Engineers, Jun. 2001, pp. 129 to 135 (partial English Translation).

(Continued)

*Primary Examiner* — Dwin M Craig
(74) *Attorney, Agent, or Firm* — Fujitsu Patent Center

(57) ABSTRACT

A memory stores a calculation formula including a disturbance term added to a position, a velocity, an acceleration, a pressure, or a density of each particle at a current time. A processor determines the disturbance term of each particle, determines the position, the velocity, and the density (position and the like) at the current time by using a position and the like at an initial time as the position and the like at the preceding time, and by applying the disturbance term to the calculation formula, and sequentially determines a position and the like at each time subsequent to the initial time by repeating a process for determining the disturbance term and the position and the like at the current time with the use of the determined position and the like of as the position and the like at the preceding time.

12 Claims, 12 Drawing Sheets

(56) References Cited

OTHER PUBLICATIONS

Notification of Transmittal of Copies of Translation of The International Preliminary Report on Patentability (Form PCT/IB/338, Form PCT/IB/373 & Form PCT/ISA/237), PCT/JP2011/053095, 6 pages, dated Aug. 29, 2013.
S. Koshizuka, et al., "A Particle Method for Incompressible Viscous Flow with Fluid Fragmentation", Computational Fluid Dynamics JOURNAL, vol. 4, No. 1, Apr. 1995, pp. 29-46.
J.J. Monaghan, "Smoothed Particle Hydrodynamics", Annual Review of Astronomy and Astrophysics, vol. 30, pp. 543-574, 1992.
S. Inutsuka, "Reformulation of Smoothed Particle Hydrodynamics with Riemann Solver", Journal of Computational Physics 179, revised Feb. 22, 2002, pp. 238-267.
M. Nakano et al., "Radioactivity Transfer Model in Global Ocean", JNC Technical Review, No. 11, Japan Nuclear Cycle Development Institute, The Japan Society of Mechanical Engineers, Jun. 2001, pp. 129 to 135 (English translation to follow).
Jun Arai, et al., "Basic Study on Solving Turbulent Flows with Moving Particle Semi-implicit Method", Nendo Nenji Taikai Koen Ronbunshu (1), Sep. 7, 2007, pp. 3 to 4. English Abstract.
International Search Report, mailed in connection with PCT/JP2011/053095 and mailed Apr. 19, 2011.
Extended European Search Report dated Jan. 31, 2014 issued in corresponding European Patent Application No. 11858951.4, 7 pages.
Monaghan, J J, "Smoothed particle hydrodynamics," Reports on Progress in Physics, Institute of Physics Publishing, vol. 68, No. 8, Aug. 1, 2005, pp. 1703-1759, XP0200B4661.

* cited by examiner

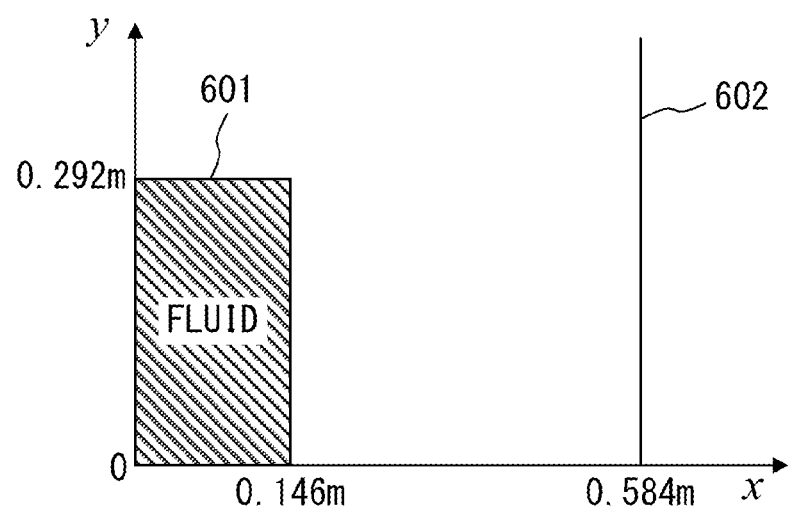
F I G. 6

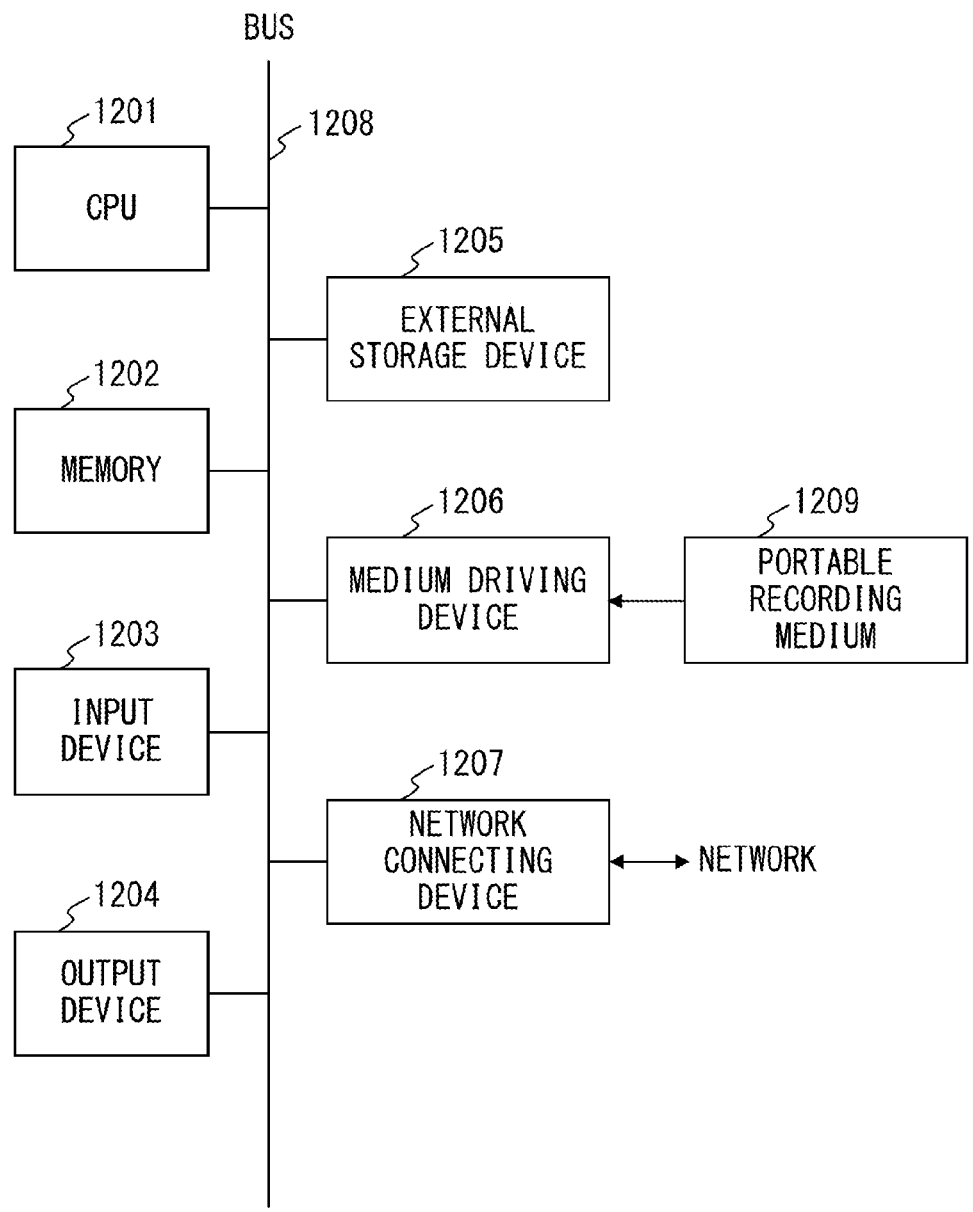
F I G. 1 2

SIMULATION DEVICE, METHOD AND PROGRAM PRODUCT TO DETERMINE PHYSICAL QUANTITY OF A PLURALITY OF PARTICLES UNDER DISTURBANCE

CROSS-REFERENCE TO RELATED APPLICATION

This application is a continuation application of International Application PCT/JP2011/053095 filed on Feb. 15, 2011 and designated the U.S., the entire contents of which are incorporated herein by reference.

FIELD

The present invention relates to a simulation device, a simulation method, and a program, which determine positions of a plurality of particles at a plurality of times.

BACKGROUND

Particle methods are known as simulation methods for representing a motion of a continuum such as a fluid, an elastic body or the like, and a powder and granular assembly by using a particle swarm. The particle methods include Moving Particle Semi-implicit (MPS) method, Smoothed Particle Hydrodynamics (SPH) method, and the like. These particle methods can more easily handle problems including a moving boundary of a free-surface flow or the like in comparison with simulation methods such as a finite difference method, a finite element method, and the like, which use a numerical mesh. Therefore, the particle methods have been increasingly used in various fields in recent years.

The particle methods are methods developed to solve a problem including a moving boundary of a free-surface flow, or the like, and a term that is called an artificial viscosity term and has an effect of suppressing a motion between particles is added to a calculation formula in order to stably calculate a motion of a particle.

For example, with the SPH method, a momentum conservation law and amass conservation law are discretized as follows.

$$\frac{dv_a}{dt} = -\sum_b m_b \left[ \left( \frac{P_b + P_a}{\rho_b \rho_a} \right) + \Pi_{ab} \right] \frac{\partial W(|r_a - r_b|, h)}{\partial r_a} \quad (1)$$

$$\frac{d\rho_a}{dt} = \sum_b m_b \frac{\rho_a}{\rho_b} (v_a - v_b) \cdot \frac{\partial W(|r_a - r_b|, h)}{\partial r_a} \quad (2)$$

In the formulas (1) and (2), a subscript a indicates an a-th particle (particle a), and a subscript b indicates a b-th particle (particle b). $r_a$, $v_a$, $\rho_a$, $P_a$, and $m_a$ respectively indicate a position vector, a velocity vector, a density, a pressure, and a mass of the particle a. Similar notations are used also for the particle b.

$$\sum_b$$

on the right side of the formulas (1) and (2) indicates a total sum with respect to all particles other than the particle a.

W is a kernel function, and used to configure a continuous field from a distribution of particles. The following cubic spline function or the like is used as the kernel function W in many cases.

$$W(r, h) = \begin{cases} \left( 1 - 1.5\left(\frac{r}{h}\right)^2 + 0.75\left(\frac{r}{h}\right)^3 \right) / \phi & 0 \leq \frac{r}{h} < 1 \\ 0.25\left(2 - \frac{r}{h}\right)^3 / \phi & 1 \leq \frac{r}{h} < 2 \\ 0 & 2 \leq \frac{r}{h} \end{cases} \quad (3)$$

h indicates a radius of an influence between particles, and a value as large as twice to three times of a mean interval between particles in an initial state is used in many cases. $\phi$ is a normalization factor adjusted so that an integrated value of the entire space of the kernel function W results in 1. This factor is decided to be 0.7 $\pi h^2$ in a case of a two dimensional space, and to be $\pi h^3$ in a case of a three dimensional space.

$\Pi_{ab}$ in the second term on the right side of the formula (1) is an artificial viscosity term that works between the particles a and b. For example, the following form is adopted.

$$\Pi_{ab} = \begin{cases} \frac{-\alpha c \mu_{ab} + \beta \mu_{ab}^2}{\rho_{ab}} & (v_a - v_b) \cdot (r_a - r_b) < 0 \\ 0 & (v_a - v_b) \cdot (r_a - r_b) \geq 0 \end{cases} \quad (4)$$

$$\mu_{ab} = \frac{h(r_a - r_b) \cdot (v_a - v_b)}{|r_a - r_b|^2 + \eta^2} \quad (5)$$

$$\rho_{ab} = \frac{\rho_a + \rho_b}{2} \quad (6)$$

$\alpha$, $\beta$, and $\eta$ are constants, and c indicates a sound velocity.

The formula (1) is an equation that represents a momentum conservation law of a fluid. The first term on the right side of the formula (1) represents a force applied by a pressure of the fluid, and has an effect such that particles press against each other. The artificial viscosity term $\Pi_{ab}$ has an effect of damping a momentum as a brake applied when particles get close each other, and of preventing the particles from moving through. The formula (2) is an equation that represents a mass conservation law of the fluid, and has an effect such that a density increases when particles get close each other or decreases when particles draw apart.

However, the forms of the formulas (1) to (3) using the artificial viscosity term make the effect that a motion is damped by the artificial viscosity term significant. Accordingly, also Godunov SPH method and the like that are intended to suppress damping of a motion by the artificial viscosity term to a minimum and use a solution to a Riemann problem have been devised.

Additionally, a particle-type fluid simulation method for reproducing wetness and repelling between a fluid and a surface of a solid, and a data processing method for efficiently executing a computational process for data of particles present in meshed space have been devised.

Patent Document 1: Japanese Laid-open Patent Publication No. 10-185755

Patent Document 2: International Publication Pamphlet No. WO 2008/020634

Non-patent Document 1: S. Koshizuka, H. Tamako and Y. Oka, "A Particle Method for Incompressible Viscous Flow with Fluid Fragmentation", Computational Fluid Dynamics Journal, vol. 4, no. 1, p. 29-46, April 1995

Non-patent Document 2: J. J. Monaghan, "Smoothed Particle Hydrodynamics", Annual Review of Astronomy and Astrophysics, vol. 30, p. 543-574, 1992

Non-patent Document 3: S. Inutsuka, "Reformulation of Smoothed Particle Hydrodynamics with Riemann Solver", Journal of Computational Physics 179, p. 238-267, 2002

SUMMARY

A computer-readable recording medium stores a program for causing a computer to execute a process.

The process includes:

determining a value of a disturbance term added to a position, a velocity, an acceleration, a pressure, or a density of each of a plurality of particles at a current time by using information of the disturbance term stored in a storage unit;

storing the value of the disturbance term of each of the plurality of particles in the storage unit;

determining the position, the velocity, and the density of each of the plurality of particles at the current time by using information of a calculation formula stored in the storage unit, the calculation formula including the disturbance term of each of the plurality of particles and determining the position, the velocity, and the density of each of the plurality of particles at the current time from a position, a velocity, and a density of each of the plurality of particles at a preceding time, by using a position, a velocity, and a density of each of the plurality of particles at an initial time as the position, the velocity, and the density of each of the plurality of particles at the preceding time, and by applying the value of the disturbance term of each of the plurality of particles to the calculation formula;

sequentially determining a position, a velocity, and a density of each of the plurality of particles at each of a plurality of times subsequent to the initial time by repeating a process for determining the value of the disturbance term of each of the plurality of particles and the position, the velocity, and the density of each of the plurality of particles at the current time with the use of the determined position, velocity, and density of each of the plurality of particles as the position, the velocity, and the density of each of the plurality of particles at the preceding time; and outputting the position of each of the plurality of particles at each of the plurality of times as a simulation result.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 6 illustrates a two-dimensional shape of a fluid at an initial time;

FIG. 12 illustrates a configuration of an information processing device.

DESCRIPTION OF EMBODIMENTS

Even the above described Godunov SPH method and the like still have a problem such that a random motion of each particle is generated from a motion on a scale as large as approximately ten times the diameter of a particle, like a particle swarm, and a large-scale regular flow is dissipated, leading to degradation of the accuracy of a simulation.

Figure 1:
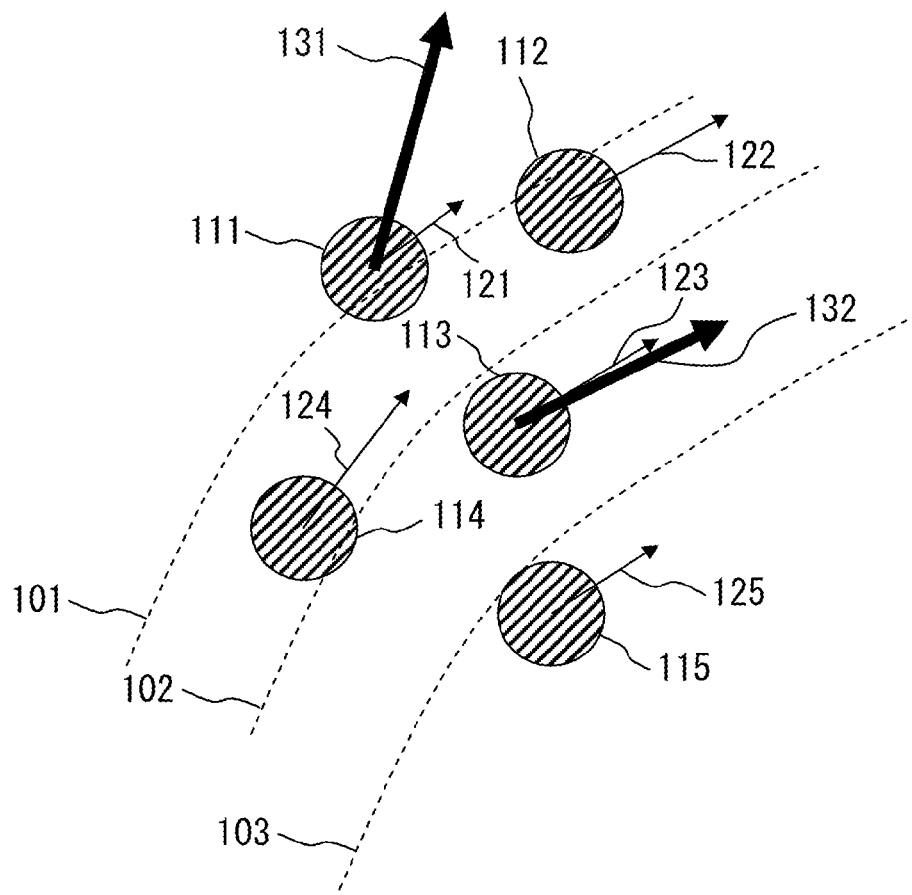
FIG. 1 illustrates a regular flow in a water surface wave simulation.

For example, when the water wave motion is simulated by the particle method, a random motion of each particle is generated from a regular flow, so that a wave height is damped more excessively than an actual height in some cases. FIG. 1 illustrates such a regular flow.

Each of broken lines 101 to 103 illustrated in FIG. 1 represents a streamline of a regular flow within a fluid, and each of vectors 121 to 125 represents a velocity vector of each of particles 111 to 115. At this time, the particles 111 and 113 receive, from the particle 114, a force in a direction deviated from the streamlines 101 to 103 as represented by vectors 131 and 132 that respectively work on the particles 111 and 113. As described above, it is considered that a phenomenon like a chain crash of hard spheres occurs from a regular flow on a scale as large as approximately 10 times or more of the diameter of a particle, a random motion of each particle is generated, and regular motions represented by the streamlines 101 to 103 are destroyed. This is a problem that occurs even when motion energy of a system is conserved and is outstanding in particle methods.

The dissipation of a water surface wave by a particle method is considered to be caused by a process where a random motion of each particle is generated from a regular flow on a scale as large as approximately 10 times or more of the diameter of a particle, and a process where the generated random motion is dissipated by an artificial viscosity term. The Godunov SPH method is a method developed to reduce the effect of the artificial viscosity term. With this method, however, the dissipation effect appears in a random motion on a small scale, so that the motion is dissipated.

An embodiment is described in detail below with reference to the drawings.

A numerical calculation algorithm of a particle method includes a procedure for updating a position and a velocity of each particle. As this procedure, the following form is adopted in many cases.

$$v_a^{n+1} = v_a^n + dt \sum_b F_{ab} \quad (11)$$

$$r_a^{n+1} = r_a^n + dt v_a^{n+1} \quad (12)$$

In the formulas (11) and (12), subscripts a and b respectively indicate particles a and b, and superscripts n and n+1 respectively indicate a time (time step) in a simulation. dt indicates a time step size when time is discretized, and $F_{ab}$ indicates a force that the particle a receives from the particle b.

Here, when a disturbance is given to a velocity of each particle, the formula (11) is extended to the following form by assuming δ, Γ, and $F_a$ as a small real number or random number, a real number, and a unit vector, respectively.

$$v_a^{n+1} = v_a^n + dt \sum_b F_{ab} + dt\delta\Gamma F_a \quad (13)$$

Figure 2:
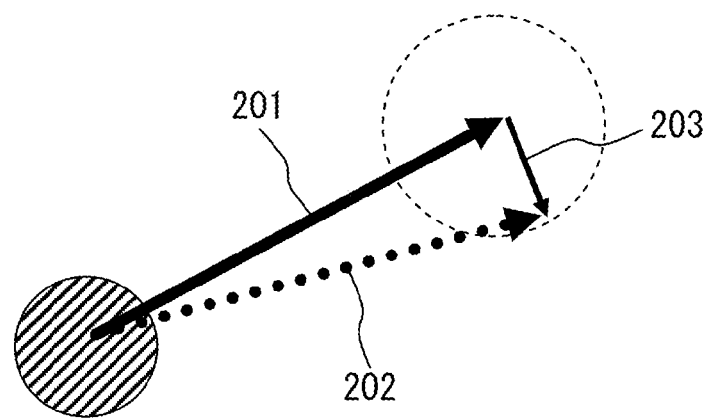
FIG. 2 illustrates a disturbance to a velocity of a particle.

The direction of $F_a$ may be deterministically decided based on information of a particle being calculated, such as a velocity distribution, a position relationship or the like of a particle swarm, or may be decided by using a random number. In this case, a disturbance vector 203 is added to a velocity vector 201 of each particle as an external force as illustrated in FIG. 2, so that a velocity vector 202 is generated.

Alternatively, when a disturbance is given to a position of each particle, the formula (12) is extended to the following form.

$$r_a^{n+1} = r_a^n + dt v_a^{n+1} + dt^2 \delta\Gamma F_a \quad (14)$$

Figure 3:
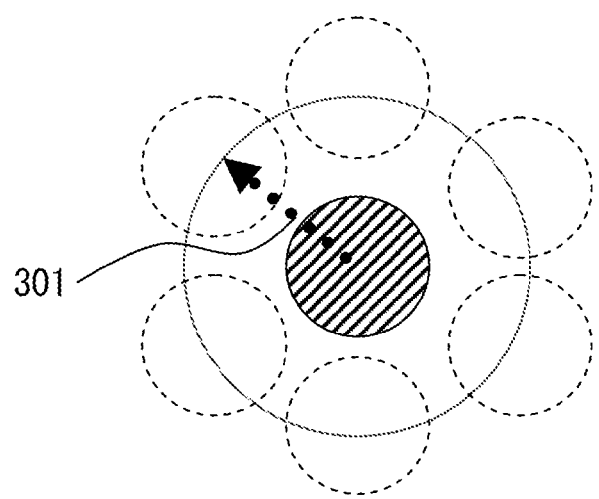
FIG. 3 illustrates a disturbance to a position of a particle.

In this case, as illustrated in FIG. 3, a disturbance vector 301 is added to a position vector of each particle as a displacement. The direction of the disturbance vector 301 may be deterministically decided based on information of a particle being calculated, or may be decided by using a random number.

Further alternatively, when a disturbance is given to an acceleration of each particle, the formula (11) is extended to the following form.

$$v_a^{n+1} = v_a^n + dt \sum_b (F_{ab} + \delta\Gamma F_a) \quad (15)$$

In this case, the disturbance is added to a force that the particle a receives from the particle b.

Further alternatively, the disturbance may be given to a pressure or a density of each particle instead of giving the disturbance to a velocity, a position, or an acceleration of each particle when a fluid calculation is performed. In this case, a pressure or a density of each particle, to which the disturbance is added, is decided as follows, and the decided pressure or density is used as the pressure or the density of the particle a.

$$p_a^{n+1} = p_a^n + \delta_p \quad (16)$$

$$\rho_a^{n+1} = \rho_a^n + \delta_\rho \quad (17)$$

The real number $\delta_p$ added as the disturbance of the pressure in the formula (16), and the real number $\delta_\rho$ added as the disturbance of the density in the formula (17) may be deterministically decided based on information of a particle being calculated, such as a velocity distribution, a position relationship or the like of a particle swarm, or may be decided by using a random number.

As described above, by giving a disturbance to the position, the velocity, the acceleration, the pressure, or the density of each particle, a random motion of each particle, which is dissipated by the artificial viscosity term, can be added, whereby dissipated motion energy can be injected. As a result, a phenomenon that motion energy flows from a large-scale motion into a small-scale random motion can be prevented, whereby the accuracy of a simulation can be improved.

For a random motion of a particle, the effect caused by the artificial viscosity term is considered to be small in a large-scale motion other than a random motion of a particle although motion energy is dissipated by the effect caused by the artificial viscosity term. Moreover, if a minute-scale random motion has a certain level of motion energy, motion energy is considered to not flow from a motion on a scale as large as approximately 10 times or more of the diameter of a particle. Accordingly, random motion energy of a particle is injected by giving a disturbance to a physical quantity of each particle, so that a position of each particle can be calculated without dissipating a motion on a scale as large as approximately ten times or more of the diameter of the particle.

Figure 4:
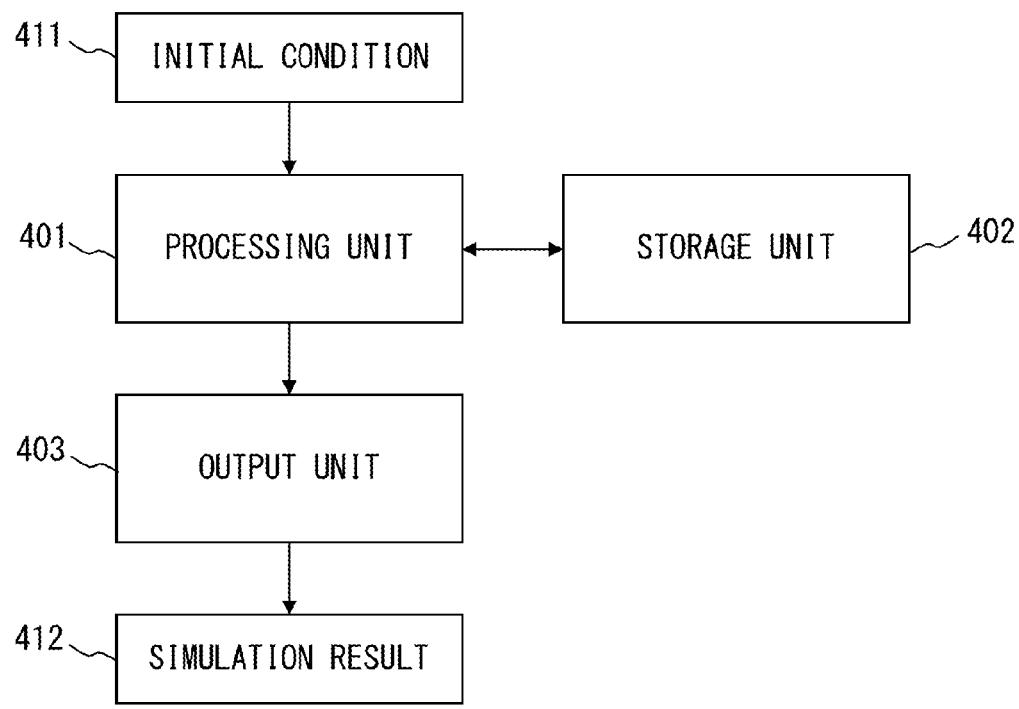
FIG. 4 illustrates a configuration of a simulation device.

FIG. 4 illustrates an example of a configuration of a simulation device according to an embodiment. The simulation device illustrated in FIG. 4 includes a processing unit 401, a storage unit 402, and an output unit 403. The simulation device outputs a simulation result 412 by performing numerical calculations with a particle method based on an initial condition 411.

The storage unit 402 stores information of a calculation formula including a disturbance term added to a physical quantity of each of a plurality of particles at a current time, for determining a position, a velocity, and a density of each of the particles at the current time based on a position, a velocity and a density of each of the particles at a preceding time.

This embodiment refers to a simulation for adding a disturbance to a velocity as a physical quantity of each particle. However, the simulation may be performed by adding the disturbance to the physical quantity other than a velocity, such as a position, an acceleration, a density, a pressure, or the like.

The processing unit 401 determines a value of a disturbance term for a velocity of each particle by using a position, a velocity, and a density of each particle at an initial time, which are included in the initial condition 411, and stores the determined value of the disturbance term in the storage unit 402. Next, the processing unit 401 determines the position, the velocity, and the density of each particle at the current time by using the position, the velocity, and the density of each particle at the initial time as the position, the velocity, and the density of each particle at a preceding time, and by applying the value of the disturbance term for the velocity of each particle to the calculation formula.

Then, the processing unit 401 repeats a process for determining the value of the disturbance term for the velocity of each particle and the position, the velocity, and the density of each particle at the current time by using the determined position, velocity, and density of each particle as the position, the velocity, and the density of each particle at the preceding time. As a result, a position, a velocity, and a density of each particle at each of a plurality of times subsequent to the initial time are sequentially obtained.

The output unit 403 outputs the determined position of each particle at each of the plurality of times as the simulation result 412.

With the disclosed simulation device, a random motion of each particle is prevented from being generated from a large-scale motion by a particle swarm by adding a disturbance term to a position, a velocity, an acceleration, a pressure, or a density of each particle in a motion simulation using a particle method. For example, in a simulation for a problem of a water surface wave or the like, a wave height can be prevented from being excessively damped by a random motion generated from a regular flow, whereby the accuracy of the simulation can be improved.

A case where the simulation is performed with a particle method by using the following motion equations of a three-dimensional fluid is initially considered.

$$\frac{D\rho}{Dt} = -\rho \nabla \cdot v \quad (21)$$

$$\frac{Dv}{Dt} = -\frac{1}{\rho} \nabla p - gz \quad (22)$$

$$p = c^2(\rho - \rho_0) \quad (23)$$

In the equations (21) to (23), $\rho(x,y,z,t)$, $p(x,y,z,t)$, and $v(x,y,z,t)$ respectively indicate a density field, a pressure field, and a velocity field of the fluid, and c indicates a sound velocity. $\nabla$ indicates a vector differential operator, x, y, and z indicate spatial coordinates, and t indicates a time. z indicates a unit vector in a z direction (vertical direction), and g indicates a gravitational acceleration. $\rho_0$ indicates a density when a pressure is 0.

The equation (21) represents the mass conservation law. The left side represents a density-time change rate, whereas the right side indicates a volume change rate of a fluid particle. Namely, the formula (21) represents a relationship between the density change rate and the volume change rate of the fluid particle.

The equation (22) is a motion equation for a fluid particle. The left side of the formula (22) is an inertia term of the fluid particle, the first term on the right side indicates a force applied by a pressure of the fluid, and the second term on the right side indicates gravity.

The equations (21) to (23) are discretized based on a Godunov SPH method, and a disturbance term is added to the velocity of each particle, so that the following calculation formulas are obtained.

$$r_a^* = r_a^n + \frac{dt}{2} v_a^n \quad (24)$$

$$v_a^{n+1} = v_a^n - 2dt \sum_b m_b \left( \frac{p_{ab}^{n+1/2}}{\rho_b^n \rho_a^n} \right) \left( \frac{L(r_a^*) + L(r_b^*)}{2} \right) \frac{\partial W(|r_a^* - r_b^*|, h)}{\partial r_b^*} - \quad (25)$$

$$dtgz + dt\Gamma_a^n F_a^n$$

$$\rho_a^{n+1} = \quad (26)$$

$$\rho_a^n + 2dt \sum_b m_b \left( \frac{v_a^{s,n+1} + v_a^{s,n}}{2} - v_{ab}^{s,n+1/2} \right) \frac{\partial}{\partial(|r_a - r_b|)} W(|r_a - r_b|, h)$$

$$r_a^{n+1} = r_a^* + \frac{dt}{2} v_a^{n+1} \quad (27)$$

In the formulas (24) to (27), $r_a^n$, $v_a^n$, $\rho_a^n$ respectively indicate a position vector, a velocity vector, and a density of the particle a at a time n. Similar notations are used also for the particle b. dt indicates a time step size. If a position vector, a velocity vector, and a density of each particle at a preceding time n are known, a position vector, a velocity vector, and a density of the particle a at a current time n+1 are obtained with the formulas (24) to (27).

Here, W is a kernel function, and L(r) is a re-standardization matrix. In a case of a three dimensional space, the re-standardization matrix is defined as follows.

$$L(r) = \begin{pmatrix} \sum_b (x_b - x) \frac{\partial}{\partial x} W(|r - r_b|, h) & \sum_b (x_b - x) \frac{\partial}{\partial y} W(|r - r_b|, h) & \sum_b (x_b - x) \frac{\partial}{\partial z} W(|r - r_b|, h) \\ \sum_b (y_b - y) \frac{\partial}{\partial x} W(|r - r_b|, h) & \sum_b (y_b - y) \frac{\partial}{\partial y} W(|r - r_b|, h) & \sum_b (y_b - y) \frac{\partial}{\partial z} W(|r - r_b|, h) \\ \sum_b (z_b - z) \frac{\partial}{\partial x} W(|r - r_b|, h) & \sum_b (z_b - z) \frac{\partial}{\partial y} W(|r - r_b|, h) & \sum_b (z_b - z) \frac{\partial}{\partial z} W(|r - r_b|, h) \end{pmatrix}^{-1} \quad (28)$$

In the formulas (24) to (28), r, v, $v_a^s$, $v_b^s$ are defined as follows.

$$r = (x, y, z) \quad (29)$$

$$v = (v^x, v^y, v^z) \quad (30)$$

$$r_{ab} = r_a - r_b \quad (31)$$

$$v_a^s = v_a \cdot \frac{r_{ab}}{|r_{ab}|} \quad (32)$$

$$v_b^s = v_b \cdot \frac{r_{ab}}{|r_{ab}|} \quad (33)$$

In the formulas (25) and (26), $P_{ab}^{n+1/2}$, $v_{ab}^{s,n+1/2}$ represent intermediate values of time space obtained by solving a one-dimensional Riemann problem between the particles a and b. Specifically, the intermediate values are decided as follows.

Initially, the following characteristic functions are defined for the particles a and b.

$$q_a^{n,+} = \log(\rho_a^n) + \frac{v_a^{s,n}}{c} \quad (41)$$

$$q_a^{n,-} = \log(\rho_a^n) - \frac{v_a^{s,n}}{c} \quad (42)$$

$$q_b^{n,+} = \log(\rho_b^n) + \frac{v_b^{s,n}}{c} \quad (43)$$

$$q_b^{n,-} = \log(\rho_b^n) - \frac{v_b^{s,n}}{c} \quad (44)$$

Additionally, a gradient is calculated as follows.

$$\nabla \log(\rho)|_a = \sum_k \frac{m_k}{\rho_a} (\log(\rho_k) - \log(\rho_a)) \frac{\partial W(|r_a - r_k|, h)}{\partial r_a} \quad (45)$$

$$\nabla v|_a = \begin{pmatrix} \sum_k \frac{m_k}{\rho_a}(v_k^x - v_a^x) & \sum_k \frac{m_k}{\rho_a}(v_k^y - v_a^y) & \sum_k \frac{m_k}{\rho_a}(v_k^z - v_a^z) \\ \frac{\partial W(|r_a - r_k|, h)}{\partial x_a} & \frac{\partial W(|r_a - r_k|, h)}{\partial x_a} & \frac{\partial W(|r_a - r_k|, h)}{\partial x_a} \\ \sum_k \frac{m_k}{\rho_a}(v_k^x - v_a^x) & \sum_k \frac{m_k}{\rho_a}(v_k^y - v_a^y) & \sum_k \frac{m_k}{\rho_a}(v_k^z - v_a^z) \\ \frac{\partial W(|r_a - r_k|, h)}{\partial y_a} & \frac{\partial W(|r_a - r_k|, h)}{\partial y_a} & \frac{\partial W(|r_a - r_k|, h)}{\partial y_a} \\ \sum_k \frac{m_k}{\rho_a}(v_k^x - v_a^x) & \sum_k \frac{m_k}{\rho_a}(v_k^y - v_a^y) & \sum_k \frac{m_k}{\rho_a}(v_k^z - v_a^z) \\ \frac{\partial W(|r_a - r_k|, h)}{\partial z_a} & \frac{\partial W(|r_a - r_k|, h)}{\partial z_a} & \frac{\partial W(|r_a - r_k|, h)}{\partial z_a} \end{pmatrix} \quad (46)$$

$$\nabla q|_a^{n,+} = \nabla \log(\rho)|_a + \frac{\nabla v|_a r_{ab}}{c} \quad (47)$$

$$\nabla q|_b^{n,+} = \nabla \log(\rho)|_b + \frac{\nabla v|_b r_{ab}}{c} \quad (48)$$

$$\nabla q|_a^{n,-} = \nabla \log(\rho)|_a - \frac{\nabla v|_a r_{ab}}{c} \quad (49)$$

$$\nabla q|_b^{n,-} = \nabla \log(\rho)|_b - \frac{\nabla v|_b r_{ab}}{c} \quad (50)$$

The formula (46) represents a velocity gradient tensor. The above described intermediate values of time space are decided as follows by using the formulas (41) to (50).

$$q_{ab}^{n+1/2,+} = q_b^{n,+} + \left(\frac{|r_{ab}|}{2} - \frac{cdt}{2}\right)(r_{ab} \cdot \nabla q|_b^{n,+}) \quad (51)$$

$$q_{a,b}^{n+1/2,-} = q_a^{n,+} - \left(\frac{|r_{ab}|}{2} + \frac{cdt}{2}\right)(r_{ab} \cdot \nabla q|_a^{n,-}) \quad (52)$$

$$\rho_{ab}^{n+1/2} = \exp\left(\frac{q_{ab}^{n+1/2,+} + q_{ab}^{n+1/2,-}}{2}\right) \quad (53)$$

$$v_{ab}^{n+1/2} = c\left(\frac{q_{ab}^{n+1/2,+} - q_{ab}^{n+1/2,-}}{2}\right) \quad (54)$$

$$p_{ab}^{n+1/2} = c^2(\rho_{ab}^{n+1/2} - \rho_0) \quad (55)$$

Incidentally, the fourth term on the right side of the formula (25) is a disturbance term added to the velocity, and decided as follows.

Energy of the particle a at the time n can be written as follows.

$$e_a^n = m_a\left[\frac{|v_a^n|^2}{2} - c^2\left(1 + \log\left(\frac{\rho_0}{\rho_a^n}\right) - \frac{\rho_0}{\rho_a^n}\right) + gz_a^n\right] \quad (61)$$

$\Gamma_a^n$ included in the disturbance term is defined as follows by using the energy represented by the formula (61).

$$\Gamma_a^n = \begin{cases} 0 & e_a^n - e_a^0 > 0 \\ 0.00002\sqrt{2|e_a^n - e_a^0|} & e_a^n - e_a^0 \leq 0 \end{cases} \quad (62)$$

Next, a random number vector is decided as follows by using random numbers $\gamma_1$ and $\gamma_2$.

$$\delta = \begin{pmatrix} 0.1\sin(\gamma_1)\cos(\gamma_2) \\ 0.1\sin(\gamma_1)\cos(\gamma_2) \\ 0.1\cos(\gamma_2) \end{pmatrix} \quad (63)$$

As the random numbers $\gamma_1$ and $\gamma_2$, for example, uniform random numbers from −1 to 1 are used. However, other random numbers may be used. Then, a unit vector that represents the direction of the disturbance is decided as follows based on the velocity vector of the particle a.

$$F_a^n = \frac{v_a^n}{|v_a^n|} + \delta \quad (64)$$

Figure 5:
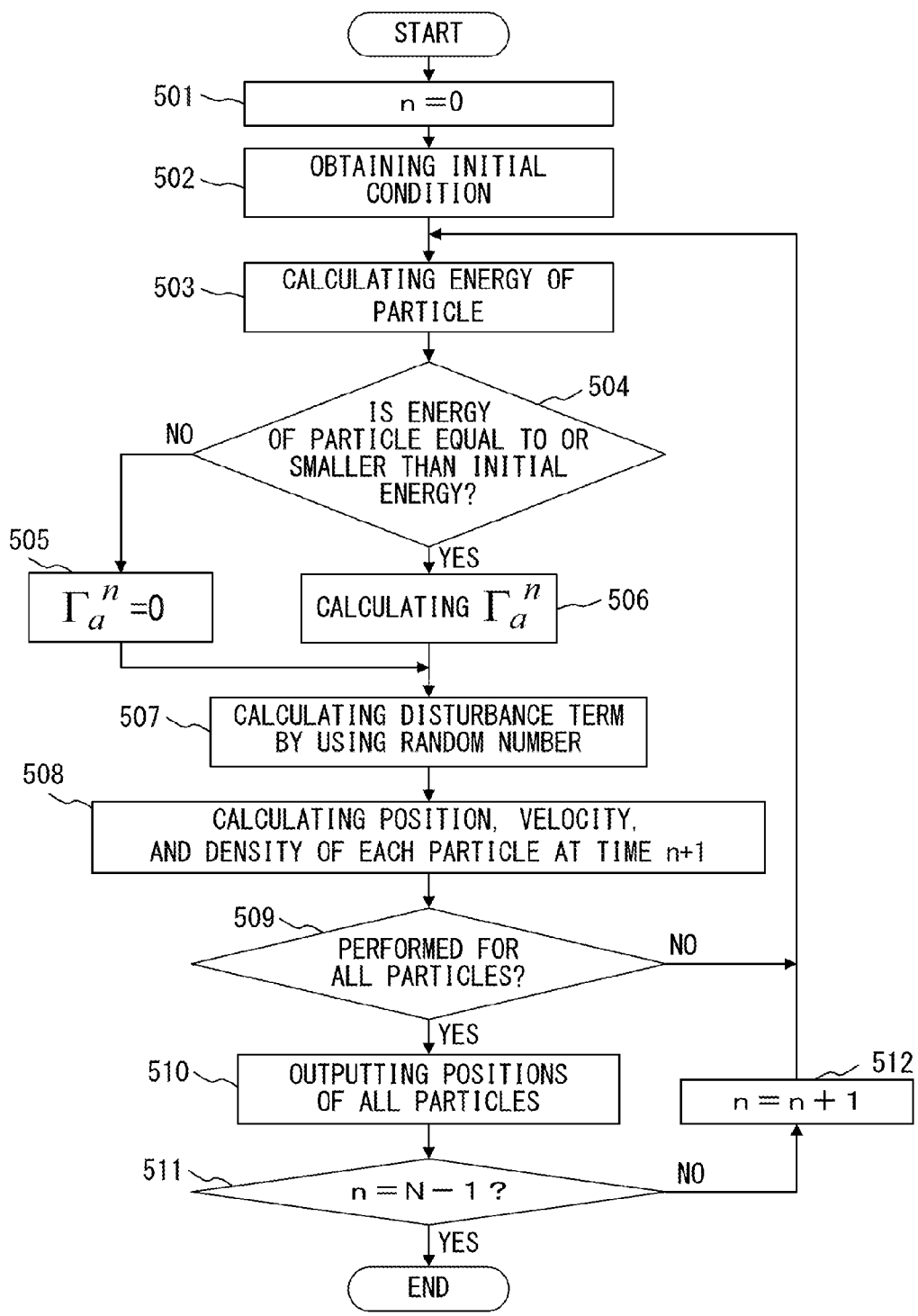
FIG. 5 is a flowchart illustrating a first simulation process.

FIG. 5 is a flowchart illustrating an example of a simulation process with which the simulation device illustrated in FIG. 4 analyzes positions of a three-dimensional particle swarm by using the formulas (24) to (64).

In this case, information of the calculation formulas, which are equivalent to the formulas (24) to (64), is stored in the storage unit 402. The information of the calculation formulas includes information of variables, constants, and the like included respectively in the formulas, and information of computations using the variables and the constants. The processing unit 401 calculates a position vector, a velocity vector, and a density of each particle at each of times from the initial time 0 to a time N (N is an integer equal to or larger than 1) while referring to the information of the calculation formulas.

Initially, the processing unit 401 sets the variable n that indicates a time to 0 (step 501), and obtains the initial condition 411 (step 502). The initial condition 411 is sometimes given from a user, or generated by the processing unit 401 with a prescribed algorithm. The initial condition 411 includes values of the position vector, the velocity vector, the density and the energy of each particle at the initial time 0, and a range of the value that can be possibly taken by the position vector.

Next, the processing unit 401 selects the initial particle within a particle swarm as a process target with the formula (61), and calculates energy of the particle as the process target at the time n (step 503). Then, the processing unit 401 compares the energy at the time n with that (initial energy) at the initial time 0 (step 504).

If the energy at the time n is equal to or smaller than the initial energy ("YES" in step 504), the processing unit 401 calculates $\Gamma_a^n$ with the formula (62) (step 506). If the energy at the time n is greater than the initial energy ("NO" in step 504), the processing unit 401 sets $\Gamma_a^n$ to 0 based on the formula (62) (step 505).

By executing the process of step 505, the effect of the disturbance term for a velocity is removed when the energy of the particle as the process target exceeds the initial energy, so that random motion energy is prevented from being excessively injected.

Next, the processing unit 401 generates random numbers $\gamma_1$ and $\gamma_2$, calculates the value of the disturbance term (the fourth term on the right side of the formula (25)) for the velocity of each particle by using the formulas (63) and (64), and stores the calculated value in the storage unit 402 (step 507). Then, the processing unit 401 calculates a position vector, a velocity vector, and a density of the particle as the process target at a time n+1 with the formulas (24) to (55) by using the position vector, the velocity vector, and the density of each particle at the time n, and the value of the disturbance term for the velocity (step 508).

Next, the processing unit 401 determines whether or not the process has been performed for all particles within the particle swarm (step 509). If a particle yet to be processed is left ("NO" in step 509), the processing unit 401 selects the next particle as a process target, and repeats the processes of steps 503 to 508. When the processing unit 401 has performed the processes for all the particles ("YES" in step 509), the processing unit 401 transfers the position vector of each particle at the time n+1 to the output unit 403.

The output unit 403 outputs the transferred position vector of each particle as the simulation result 412 at the time n+1 in a prescribed form (step 510). As a method for outputting the simulation result 412, a method for displaying the simulation result 412 as image information of a particle swarm on a screen of a display device, or a method for transferring the simulation result 412 to a printer or an information processing device via a wired or wireless communication line is considered. The velocity vector, the density, and the like of each particle may be included and output as the simulation result 412.

Next, the processing unit 401 determines whether or not n has reached N−1 (step 511). If n is smaller than N−1 ("NO" in step 511), the processing unit 401 sets n to n+1 (step 512), and repeats the processes of steps 503 to 510. When n has reached N−1 ("YES" in step 511), the processing unit 401 terminates the simulation process.

In the simulation process illustrated in FIG. 5, it is not always needed to execute all the steps. Some of the steps can be omitted according to a simulation target or an initial condition. For example, if there is a low possibility that random motion energy is excessively injected, the processes of steps 504 and 505 may be omitted.

If positions of a two-dimensional particle swarm are analyzed as a replacement for a three-dimensional particle swarm, a simulation process similar to that of FIG. 5 can be executed by changing a three-dimensional vector to a two-dimensional vector and by changing part of the calculation formulas.

In this case, the following re-standardization matrix is used as a replacement for the re-standardization matrix represented by the formula (28).

$$L_2(r) = \begin{pmatrix} \sum_b (x_b - x) \frac{\partial}{\partial x} W(|r - r_b|, h) & \sum_b (x_b - x) \frac{\partial}{\partial y} W(|r - r_b|, h) \\ \sum_b (y_b - y) \frac{\partial}{\partial x} W(|r - r_b|, h) & \sum_b (y_b - y) \frac{\partial}{\partial y} W(|r - r_b|, h) \end{pmatrix}^{-1} \quad (71)$$

Additionally, the following velocity gradient tensor is used as a replacement for the velocity gradient tensor represented by the formula (46).

$$\nabla v|_{a,2} = \begin{pmatrix} \sum_k \frac{m_k}{\rho_a}(v_k^x - v_a^x) & \sum_k \frac{m_k}{\rho_a}(v_k^y - v_a^y) \\ \frac{\partial W(|r_a - r_k|, h)}{\partial x_a} & \frac{\partial W(|r_a - r_k|, h)}{\partial x_a} \\ \sum_k \frac{m_k}{\rho_a}(v_k^x - v_a^x) & \sum_k \frac{m_k}{\rho_a}(v_k^y - v_a^y) \\ \frac{\partial W(|r_a - r_k|, h)}{\partial y_a} & \frac{\partial W(|r_a - r_k|, h)}{\partial y_a} \end{pmatrix} \quad (72)$$

Furthermore, a rotation matrix A is decided as follows by using a random number γ as a replacement for the random numbers $\gamma_1$ and $\gamma_2$.

$$\theta = \gamma \frac{\pi}{4} \quad (73)$$

$$A = \begin{pmatrix} \cos(\theta) & -\sin(\theta) \\ \sin(\theta) & \cos(\theta) \end{pmatrix} \quad (74)$$

As the random number γ, for example, a uniform random number from −1 to 1 is used. However, other random numbers may be used. Then, a unit vector that represents a direction of a disturbance to a velocity is decided by using the following formula as a replacement for the formula (64).

$$F_a^n = A \frac{v_a^n}{|v_a^n|} \quad (75)$$

Here, results of a simulation performed for a dam-break problem of a two-dimensional fluid are described as a general benchmark test of a free surface flow. The dam-break problem is a phenomenon that a mass of a fluid standing still in contact with a wall at an initial time 0 is broken by a constant gravity as time elapses.

FIG. 6 illustrates a two-dimensional shape of the fluid at the initial time 0. In FIG. 6, an x axis, a y axis, and a linear line 602 of x=0.584 (m) respectively correspond to a left wall, a bottom, and a right wall of the dam, and the fluid in the shape of a rectangle 601 stands still in a range of x=0 to 0.146 (m) and y=0 to 0.292 (m).

As an initial condition at the time 0 (t=0), a particle swarm is arranged by providing a uniform lattice at lattice intervals of 0.00365 m within the rectangle 601, and an initial velocity and an initial density of each particle are respectively defined to be $v_a^0$=0 (m/s) and $\rho_a^0 = \rho_0$. The density $\rho_0$, the gravitational acceleration g, and the sound velocity c are assumed to be 1000 kg/m$^3$, 9.8 m/s$^2$, and 23.92 m/s, respectively. As the time step size dt, 1.526×10$^{-5}$ s is used.

Figure 7:
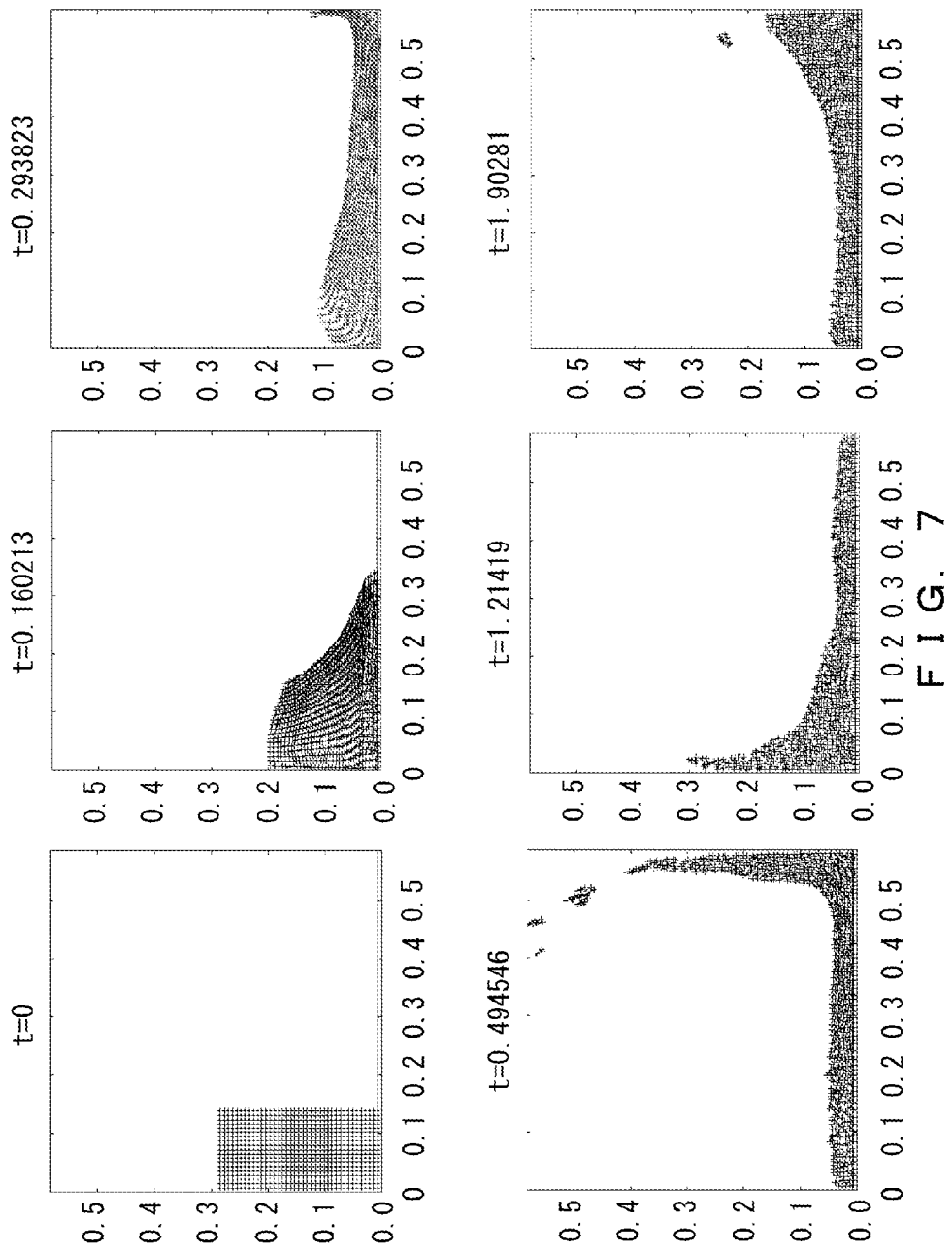
FIG. 7 is a schematic (No. 1) illustrating simulation results when a disturbance term is not added.
Figure 8:
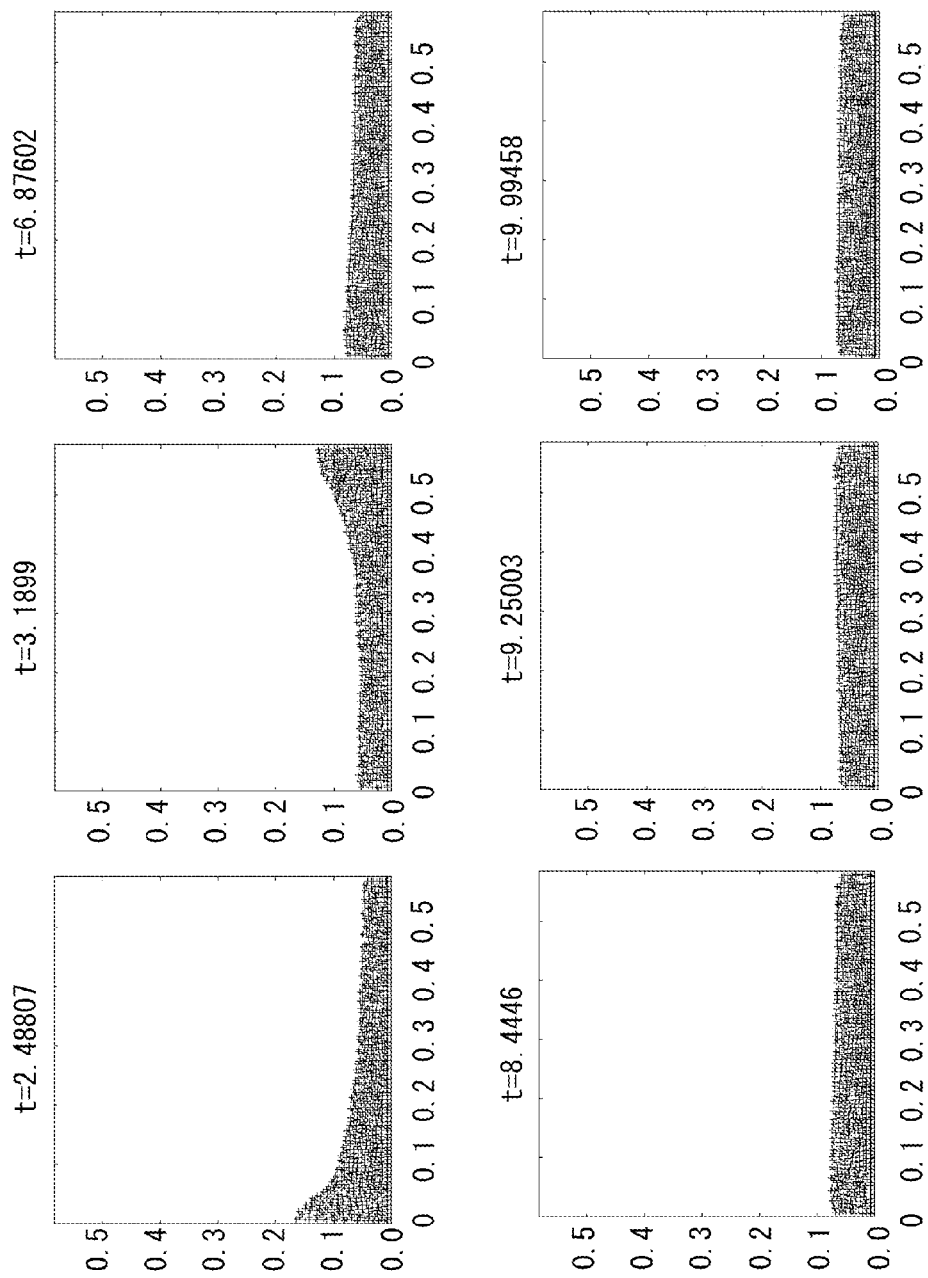
FIG. 8 is a schematic (No. 2) illustrating simulation results when the disturbance term is not added.

FIGS. 7 and 8 illustrate images of simulation results obtained with a standard Godunov SPH method when a disturbance term is not added to a velocity in the formula (25), and depict shapes of the fluid at 12 times in a case of t=0 to 9.99458 (s).

Figure 9:
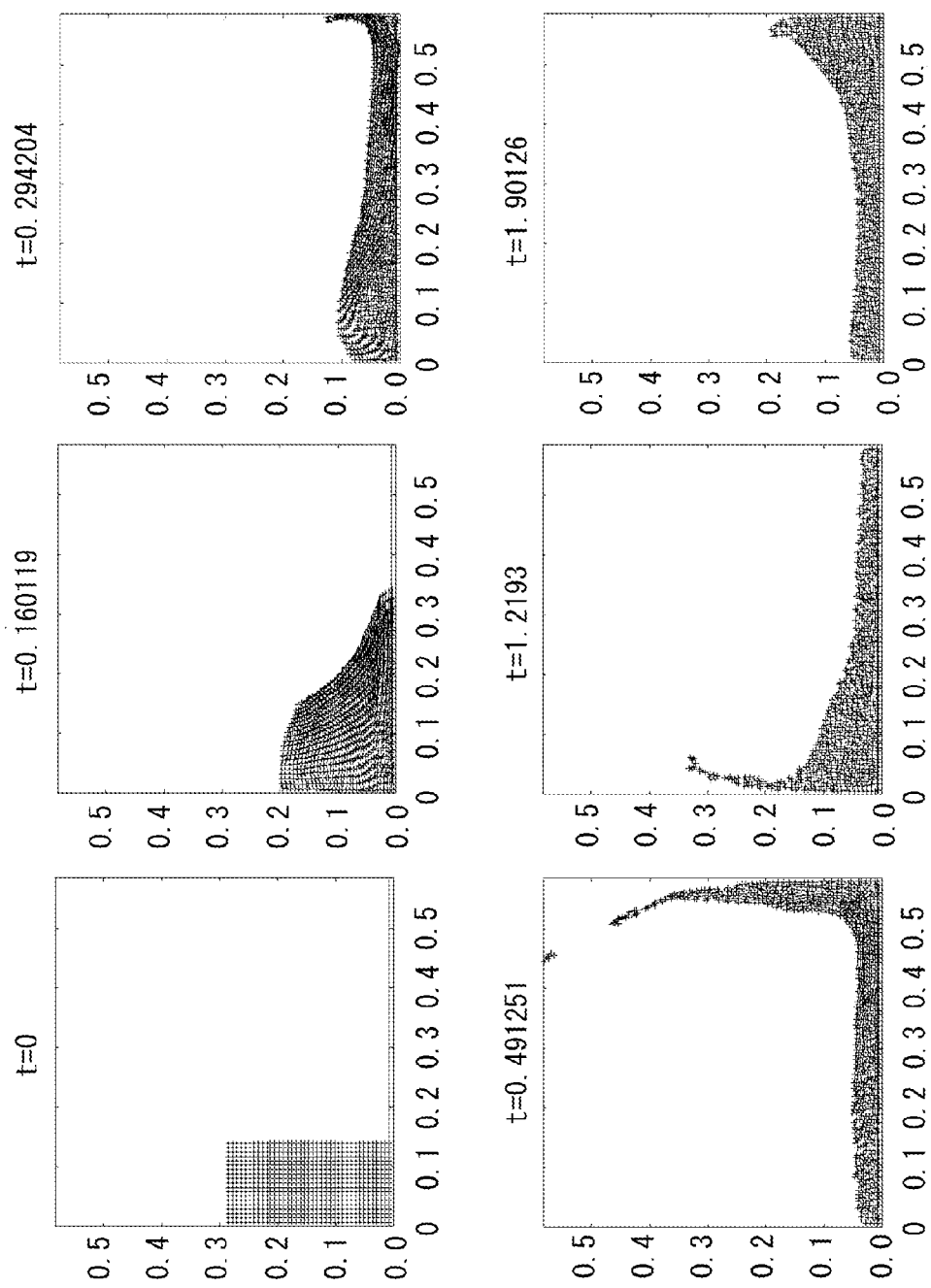
FIG. 9 is a schematic (No. 1) illustrating simulation results when a disturbance term is added.
Figure 10:
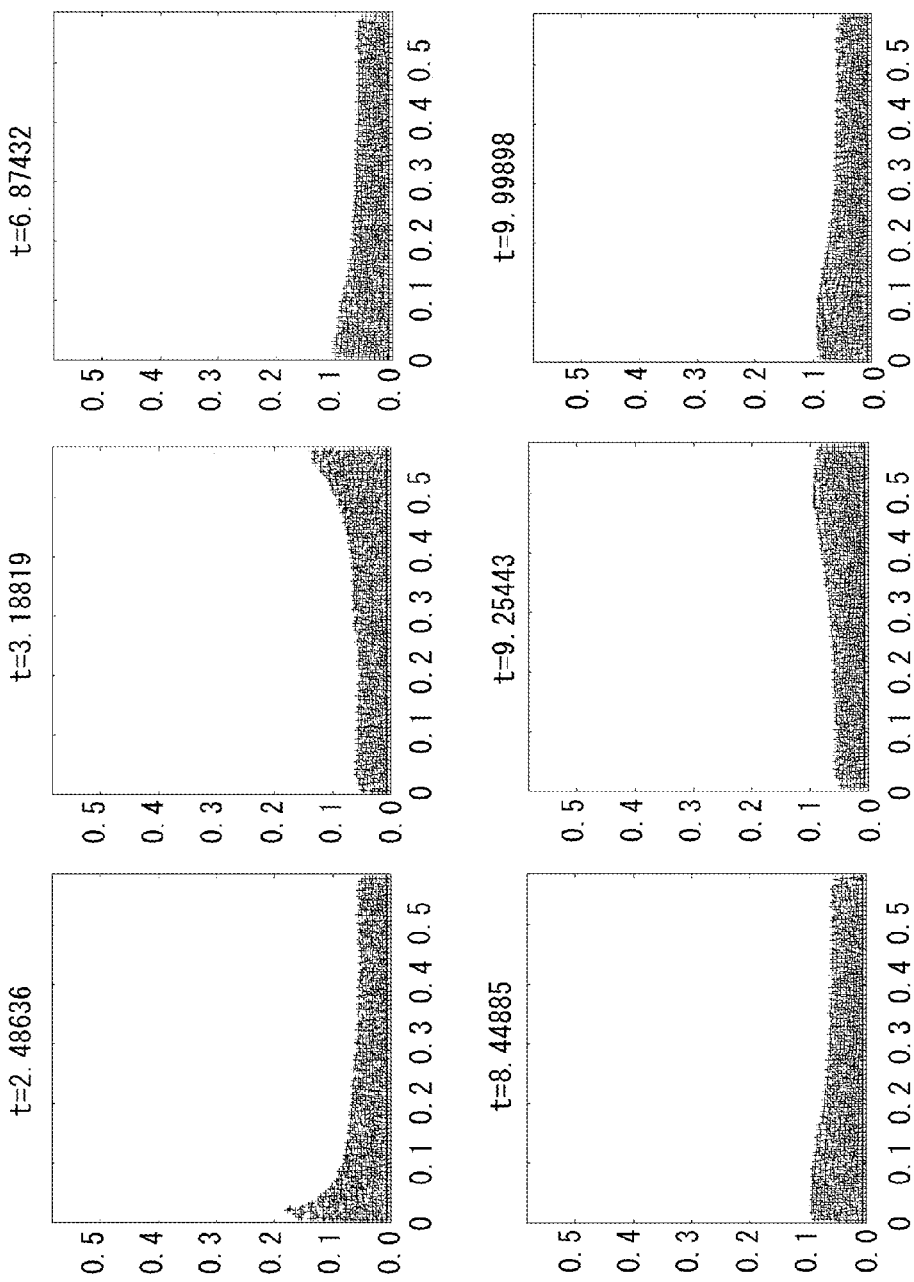
FIG. 10 is a schematic (No. 2) illustrating simulation results when the disturbance term is added.

In contrast, FIGS. 9 and 10 illustrate images of simulation results obtained when the disturbance term is added to the velocity in the formula (25), and depict shapes of the fluid at 12 times in a case of t=0 to 9.99898 (s).

When the disturbance term for the velocity is not added, a wave almost disappears at and after t=6.87602 (s) illustrated in FIG. 8. In contrast, when the disturbance term for the velocity is added, a wave remains also at and after t=6.87432 (s) illustrated in FIG. 10. It is proved that damping of the wave is improved by suppressing excessive damping of the wave seen at and after t=6.87602 (s) illustrated in FIG. 8 when the disturbance term for the velocity is not added.

As described above, the disturbance is given to the velocity of each particle in the formula (25). However, the disturbance may be added to a position, an acceleration, a pressure or a density as a replacement for the velocity. For example, when a disturbance is given to the position of each particle, the simulation process illustrated in FIG. 5 can be executed by rewriting the formulas (25) and (27) as follows.

$$v_a^{n+1} = \qquad (76)$$

$$v_a^n - 2dt \sum_b m_b \left( \frac{p_{ab}^{n+1/2}}{\rho_b^n \rho_a^n} \right) \left( \frac{L(r_a^*) + L(r_b^*)}{2} \right) \frac{\partial W(|r_a^* - r_b^*|, h)}{\partial r_b^*} - dtgz$$

$$r_a^{n+1} = r_a^* + \frac{dt}{2} v_a^{n+1} + dt^2 \Gamma_a^n F_a^n \qquad (77)$$

The formula (76) corresponds to a calculation formula implemented by removing, from the formula (25), the disturbance term for the velocity in the fourth term on the right side. The third term on the right side of the formula (77) is the disturbance term added to the position. In this case, the processing unit 401 calculates the third term on the right side of the formula (77) instead of calculating the fourth term on the right side of the formula (25) in step 507 of FIG. 5. A method for deciding a unit vector that represents the direction of a disturbance by using a random number is similar to that in a case where the disturbance is given to the velocity. Then, in step 508 of FIG. 5, the position vector, the velocity vector, and the density of a particle as a process target at a time n+1 are calculated by using the formulas (76) and (77) as a replacement for the formulas (25) and (27).

Next, the formula (25) is rewritten as follows when the disturbance is given to the acceleration of each particle, so that the simulation process illustrated in FIG. 5 can be executed.

$$v_a^{n+1} = v_a^n - \qquad (78)$$

$$2dt \sum_b m_b \left( \frac{p_{ab}^{n+1/2} + \gamma \Gamma_a^n}{\rho_b^n \rho_a^n} \right) \left( \frac{L(r_a^*) + L(r_b^*)}{2} \right) \frac{\partial W(|r_a^* - r_b^*|, h)}{\partial r_b^*} - dtgz$$

The formula (78) corresponds to a calculation formula implemented by removing, from the formula (25), the disturbance term for the velocity in the fourth term on the right side and by replacing the second term $p_{ab}^{n+1/2}$ on the right side with $p_{ab}^{n+1/2} + \gamma \sigma_a^n$. A portion including $\gamma \Gamma_a^n$ in the second term on the right side of the formula (78) is the disturbance term added to the acceleration. In this case, the processing unit 401 calculates the disturbance term of the formula (78) instead of calculating the fourth term on the right side of the formula (25) in step 507 of FIG. 5. At this time, the disturbance term is calculated by using the random number $\gamma$ as a replacement for the random numbers $\gamma_1$ and $\gamma_2$. Then, the processing unit 401 calculates the position vector, the velocity vector, and the density of the particle as the process target at the time n+1 by using the formula (78) as a replacement for the formula (25) in step 508 of FIG. 5.

Next, when the disturbance is given to the density of each particle, the formula (26) can be rewritten as follows by replacing the formula (25) with the formula (76).

$$\rho_a^{n+1} = \rho_a^n + \qquad (79)$$

$$2dt \sum_b m_b \left( \frac{v_a^{s,n+1} + v_a^{s,n}}{2} - v_{ab}^{s,n+1/2} \right) \frac{\partial}{\partial(|r_a - r_b|)} W(|r_a - r_b|, h) + \delta$$

The random number $\delta$ in the third term on the right side of the formula (79) is the disturbance term added to the density. In this case, the processing unit 401 executes the simulation process illustrated in FIG. 11 as a replacement for that illustrated in FIG. 5.

Figure 11:
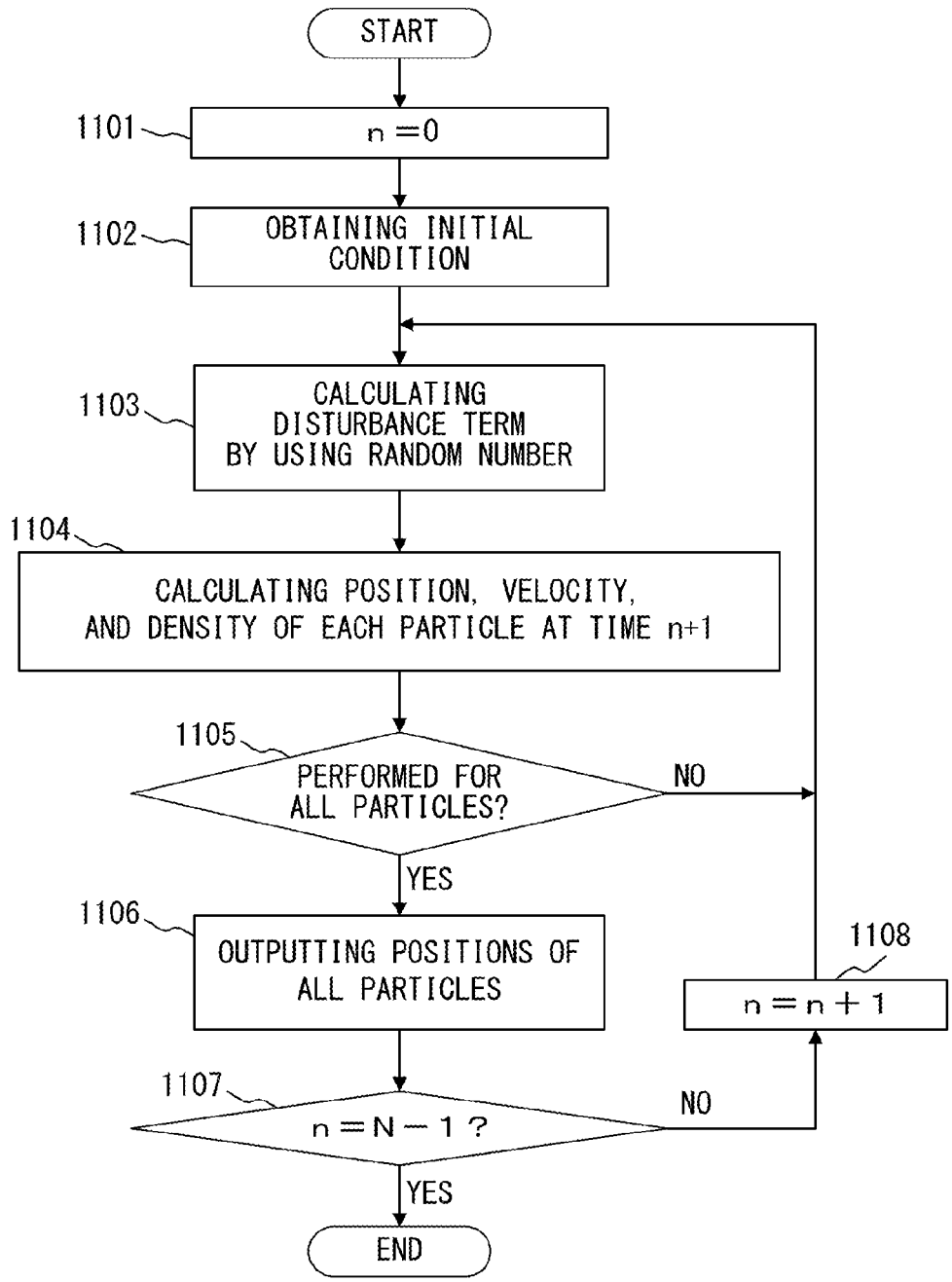
FIG. 11 is a flowchart illustrating a second simulation process.

The simulation process illustrated in FIG. 11 corresponds to a process implemented by removing the processes of steps 503 to 506 from the simulation process illustrated in FIG. 5. The processes of steps 1101 to 1108 correspond to those of steps 501, 502, and 507 to 512 illustrated in FIG. 5.

However, the processing unit 401 generates the random number $\delta$ instead of calculating the fourth term on the right side of the formula (25), and stores, in the storage unit 402, the value of the random number as a value of the disturbance term for the density in step 1103. As the random number $\delta$, for example, a uniform random number from −0.00002 to 0.00002 is used. However, other random numbers may be used.

Then, in step 1104, the processing unit 401 calculates the position vector, the velocity vector, and the density of the particle as the process target at the time n+1 by using the position vector, the velocity vector, and the density of each particle at the time n, and the value of the disturbance term for the density. In this case, the formulas (24), (76), (79), and (27) to (55) are used as calculation formulas.

Next, when the disturbance is given to the pressure of each particle, the simulation process illustrated in FIG. 11 can be executed by replacing the formula (25) with the formula (76) and by rewriting the formula (55) for obtaining an intermediate value of a pressure as follows.

$$p_{ab}^{n+1/2} = c^2(\rho_{ab}^{n+1/2} - \rho_0) + \delta_p \qquad (80)$$

The random number $\delta_p$ in the second term on the right side of the formula (80) is a disturbance term added to the pressure. In this case, the processing unit 401 generates the random number $\delta_p$, and stores, in the storage unit 402, the value of the random number as the value of the disturbance term for the pressure in step 1103. As the random number $\delta_p$, for example, a uniform random number from −0.00002 to 0.00002 is used. However, other random numbers may be used.

Then, in step 1104, the processing unit 401 calculates the position vector, the velocity vector, and the density of the particle as the process target at the time n+1 by using the position vector, the velocity vector, and the density of each particle at the time n, and the value of the disturbance term for the pressure. In this case, the formulas (24), (76), (26) to (54), and (80) are used as calculation formulas.

The simulation device illustrated in FIG. 4 can be used for not only a wave motion analysis of propagation of a water surface wave, or the like, but also another simulation process for analyzing a motion of a continuum such as a fluid, an elastic body or the like, and a powder and granular assembly. Moreover, the calculation formulas used in the simulation process are not limited to the formulas (24) to (80). Other calculation formulas for giving a disturbance to a physical quantity of each particle may be used.

The simulation device illustrated in FIG. 4 can be implemented, for example, by using an information processing device (computer) illustrated in FIG. 12. The information processing device illustrated in FIG. 12 includes Central Processing Unit (CPU) 1201, a memory 1202, an input device 1203, an output device 1204, an external storage device 1205, a medium driving device 1206, and a network connecting device 1207. These components are interconnected by a bus 1208.

The memory 1202 is, for example, a semiconductor memory such as Read Only Memory (ROM), Random Access Memory (RAM), a flash memory, or the like. The memory 1202 stores a program and data, which are used for the simulation process. For example, the CPU 1201 executes the simulation process illustrated in FIG. 5 or FIG. 11 by executing a program with the memory 1202. The memory 1202 can be used also as the storage unit 402 illustrated in FIG. 4.

The input device 1203 is, for example, a keyboard, a pointing device, or the like, and is used to input an instruction or information from an operator. The output device 1204 is, for example, a display device, a printer, a speaker, or the like, and is used to output an inquiry or process results to an operator. The output device 1204 can be used also as the output unit 403 illustrated in FIG. 4.

The external storage device 1205 is, for example, a magnetic disk device, an optical disk device, a magneto-optical disk device, a tape device, or the like. The external storage device 1205 includes also a hard disk drive. The information processing device can store a program and data in the external storage device 1205, and can use the program and the data by loading them into the memory 1202.

The medium driving device 1206 drives a portable recording medium 1209, and accesses contents recorded thereon. The portable recording medium 1209 is a memory device, a flexible disk, an optical disk, a magneto-optical disk, or the like. The portable recording medium 1209 also includes Compact Disk Read Only Memory (CD-ROM), Digital Versatile Disk (DVD), Universal Serial Bus (USB) memory, and the like. An operator can store a program and data on the portable recording medium 1209, and can use the program and the data by loading them into the memory 1202.

As described above, a computer-readable recording medium for storing a program and data, which are used for the simulation process, includes a physical (non-transitory) recording medium such as the memory 1202, the external storage device 1205, and the portable recording medium 1209.

The network connecting device 1207 is a communication interface, connected to a communication network 103, for performing a data conversion accompanying a communication. The information processing device can receive a program and data from an external device via the network connecting device 1207, and can use the program and the data by loading them into the memory 1202. The network connecting device 1207 can be used also as the output unit 403 illustrated in FIG. 4.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a program for causing a computer to execute a process, the process comprising:
   determining a value of a disturbance term added to a position, a velocity, an acceleration, a pressure, or a density of each of a plurality of particles representing a fluid at a current time by using information of the disturbance term stored in a storage unit;
   storing the value of the disturbance term of each of the plurality of particles in the storage unit;
   determining the position, the velocity, and the density of each of the plurality of particles at the current time by using information of a calculation formula stored in the storage unit, the calculation formula including a viscosity term to damp a motion of two particles of the plurality of particles when the two particles pet close each other and the disturbance term of each of the plurality of particles to add a random motion of each of the plurality of particles that is dissipated by the viscosity term and determining the position, the velocity, and the density of each of the plurality of particles at the current time from a position, a velocity, and a density of each of the plurality of particles at a preceding time, by using a position, a velocity, and a density of each of the plurality of particles at an initial time as the position, the velocity, and the density of each of the plurality of particles at the preceding time, and by applying the value of the disturbance term of each of the plurality of particles to the calculation formula;
   sequentially determining a position, a velocity, and a density of each of the plurality of particles at each of a plurality of times subsequent to the initial time by repeating a process for determining the value of the disturbance term of each of the plurality of particles and the position, the velocity, and the density of each of the plurality of particles at the current time with the use of the determined position, velocity, and density of each of the plurality of particles as the position, the velocity, and the density of each of the plurality of particles at the preceding time; and
   outputting the position of each of the plurality of particles at each of the plurality of times as a simulation result,
   wherein the computer determines energy of each of the plurality of particles at the preceding time by using the position, the velocity, and the density of each of the plurality of particles at the preceding time, and determines the value of the disturbance term of one of the plurality of particles by using the determined energy when the determined energy is smaller than energy of the one of the plurality of particles at the initial time.

2. The non-transitory computer-readable recording medium according to claim 1, wherein the computer determines the value of the disturbance term added to the position or the velocity of each of the plurality of particles by using a random number that indicates a direction of the disturbance added to the position or the velocity of each of the plurality of particles at the current time.

3. The non-transitory computer-readable recording medium according to claim 1, wherein the computer determines the value of the disturbance term added to the acceleration, the pressure, or the density of each of the plurality of particles by using a random number that indicates a size of a disturbance added to the acceleration, the pressure, or the density of each of the plurality of particles at the current time.

4. The non-transitory computer-readable recording medium according to claim 1, wherein the computer sets the value of the disturbance term of the one of the plurality of particles to 0 when the determined energy is higher than the energy of the one of the plurality of particles at the initial time.

5. A simulation device comprising:
   a memory configured to store information of a calculation formula including a viscosity term to damp a motion of two particles of the plurality of particles when the two particles get close each other and a disturbance term added to a position, a velocity, an acceleration, a pressure, or a density of each of a plurality of particles representing a fluid at a current time, the disturbance term adding a random motion of each of the plurality of particles that is dissipated by the viscosity term and the calculation formula determining the position, the velocity, and the density of each of the plurality of particles at the current time from a position, a velocity, and a density of each of the plurality of particles at a preceding time; and a processor configured to determine a value of the disturbance term of each of the plurality of particles, to store the value of the disturbance term of each of the plurality of particles in the memory, to determine the position, the velocity, and the density of each of the plurality of particles at the current time by using a position, a velocity, and a density of each of the plurality of particles at an initial time as the position, the velocity, and the density of each of the plurality of particles at the preceding time, and by applying the value of the disturbance term of each of the plurality of particles to the calculation formula, and to sequentially determine a position, a velocity, and a density of each of the plurality of particles at each of a plurality of times subsequent to the initial time by repeating a process for determining the value of the disturbance term of each of the plurality of particles and the position, the velocity, and the density of each of the plurality of particles at the current time with the use of the determined position, velocity, and density of each of the plurality of particles as the position, the velocity, and the density of each of the plurality of particles at the preceding time; and an output unit configured to output the position of each of the plurality of particles at each of the plurality of times as a simulation result, wherein the processor determines energy of each of the plurality of particles at the preceding time by using the position, the velocity, and the density of each of the plurality of particles at the preceding time, and determines the value of the disturbance term of one of the plurality of particles by using the determined energy when the determined energy is smaller than energy of the one of the plurality of particles at the initial time.

6. The simulation device according to claim 5, wherein the processor determines the value of the disturbance term added to the position or the velocity of each of the plurality of particles by using a random number that indicates a direction of the disturbance added to the position or the velocity of each of the plurality of particles at the current time.

7. The simulation device according to claim 5, wherein the processor determines the value of the disturbance term added to the acceleration, the pressure, or the density of each of the plurality of particles by using a random number that indicates a size of the disturbance added to the acceleration, the pressure, or the density of each of the plurality of particles at the current time.

8. The simulation device according to claim 5, wherein the processor sets the value of the disturbance term of the one of the plurality of particles to 0 when the determined energy is higher than the energy of the one of the plurality of particles at the initial time.

9. A simulation method executed by a computer, the method comprising:

determining by a processor, a value of a disturbance term added to a position, a velocity, an acceleration, a pressure, or a density of each of a plurality of particles representing a fluid at a current time by using information of the disturbance term stored in a storage unit;

storing the value of the disturbance term of each of the plurality of particles in the storage unit;

determining by the processor, the position, the velocity, and the density of each of the plurality of particles at the current time by using information of a calculation formula stored in the storage unit, the calculation formula including a viscosity term to damp a motion of two particles of the plurality of particles when the two particles get close each other and the disturbance term of each of the plurality of particles to add a random motion of each of the plurality of particles that is dissipated by the viscosity term and determining the position, the velocity, and the density of each of the plurality of particles at the current time from a position, a velocity, and a density of each of the plurality of particles at a preceding time, by using a position, a velocity, and a density of each of the plurality of particles at an initial time as the position, the velocity, and the density of each of the plurality of particles at the preceding time, and by applying the value of the disturbance term of each of the plurality of particles to the calculation formula;

sequentially determining by the processor, a position, a velocity, and a density of each of the plurality of particles at each of a plurality of times subsequent to the initial time by repeating a process for determining the value of the disturbance term of each of the plurality of particles, and the position, the velocity, and the density of each of the plurality of particles at the current time with the use of the determined position, velocity, and density of each of the plurality of particles as the position, the velocity, and the density of each of the plurality of particles at the preceding time; and outputting the position of each of the plurality of particles at each of the plurality of times as a simulation result, wherein the processor determines energy of each of the plurality of particles at the preceding time by using the position, the velocity, and the density of each of the plurality of particles at the preceding time, and determines the value of the disturbance term of one of the plurality of particles by using the determined energy when the determined energy is smaller than energy of the one of the plurality of particles at the initial time.

10. The simulation method according to claim 9, wherein the processor determines the value of the disturbance term added to the position or the velocity of each of the plurality of particles by using a random number that indicates a direction of a disturbance added to the position or the velocity of each of the plurality of particles at the current time.

11. The simulation method according to claim 9, wherein the processor determines the value of the disturbance term added to the acceleration, the pressure, or the density of each of the plurality of particles by using a random number that indicates a size of a disturbance added to the acceleration, the pressure, or the density of each of the plurality of particles at the current time.

12. The simulation method according to claim 9, wherein the processor sets the value of the disturbance term of the one of the plurality of particles to 0 when the determined energy is higher than the energy of the one of the plurality of particles at the initial time.

* * * * *